Nov. 5, 1935.  W. KUNTZE  2,019,497
ACOUSTIC ECHO DISTANCE MEASURING SYSTEM
Filed May 10, 1934

INVENTOR
WALTER KUNTZE
BY Ezekiel Wolf
ATTORNEY

Patented Nov. 5, 1935

2,019,497

UNITED STATES PATENT OFFICE 2,019,497

ACOUSTIC ECHO DISTANCE MEASURING SYSTEM

Walter Kuntze, Bremen, Germany, assignor to Submarine Signal Company, Boston, Mass., a corporation of Maine Application May 10, 1934, Serial No. 725,013
In Germany May 29, 1933

9 Claims. (Cl. 181—0.5)

The present invention relates to apparatus for distance measurement and more particularly to apparatus for acoustic echo depth sounding or height measurement for use on ships and aircraft.

Systems for measuring the distance of a sound reflecting surface from a source of sound with the aid of the sound echo are well known. The depths of water beneath a ship and the altitude of aircraft above the ground can be determined with such systems. The signals employed are usually either a short impulse such as may be produced by an impact oscillator or an explosion or a sound of a definite frequency. In the latter class sound waves of a highly directive character have been found to be useful. They provide particularly a greater accuracy since only a limited portion of the reflecting surface is used for reflecting the echo. This is of particular advantage when the reflecting surface, such as the ocean floor or the surface of the earth, is very irregular.

The directional characteristic of compressional waves has been obtained most easily by using comparatively high frequencies since their production in a definitely oriented direction may be obtained by the use of a diaphragm having reasonable dimensions. If a sufficiently high frequency is used, the further advantage is obtained that the signals become inaudible. Lower frequency signals with a sharply directive characteristic may, however, also be produced conveniently by using a plurality of individual sound senders each having a diaphragm whose dimensions are small compared with the wave length, instead of using a diaphragm whose dimensions are large with reference to the wave length.

The sound senders for depth and height measurement have in prior arrangements been rigidly mounted in the ship or aircraft. This has led to a number of disadvantages where a sharply directive sound signal is employed. When the ship pitches or rolls or the aircraft is climbing or banking, the reflected waves does not in many cases reach the receiver with the necessary intensity and may even miss it entirely. According to the present invention this disadvantage is completely avoided.

According to the present invention the sending device is movably suspended in such a manner that the direction of maximum compressional wave radiation is always vertically downwards irrespective of the position of the ship. In other words, the sound beam is always sent vertically downwards.

Figure 1:
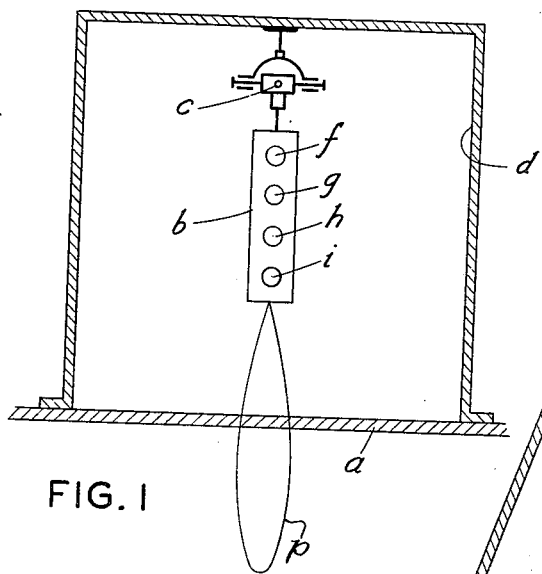
Figure 2:
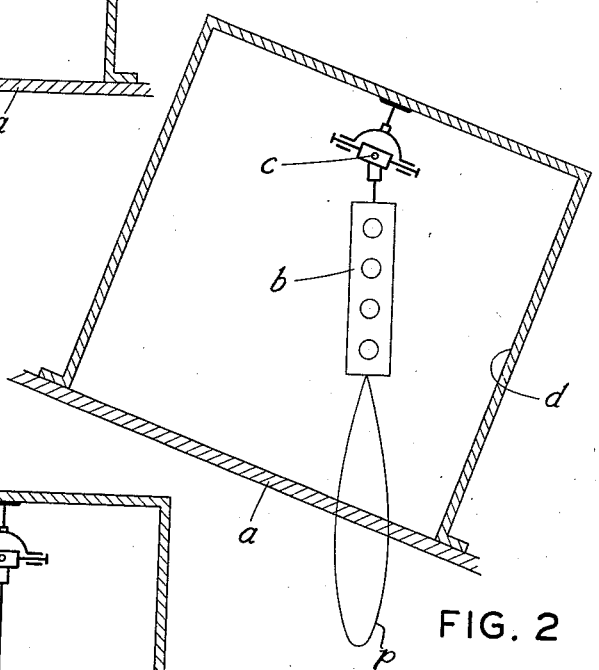

A further description of the invention may be obtained with reference to the drawing in which Fig. 1 shows a multispot sender mounted in a water-filled tank in a ship in accordance with the present invention; Fig. 2 shows the same arrangement when the ship is not in a horizontal position; and Fig. 3 shows a corresponding arrangement for a multispot group of sound senders arranged in a different manner.

In the drawing the ship's skin is indicated at $a$. A water-filled chamber $d$ is mounted against the skin as is well known in the art. In the arrangement shown in Figs. 1 and 2 a multispot group $b$ of sound senders is employed. This group consists of four individual compressional wave radiators $f$, $g$, $h$ and $i$ whose diaphragms have a diameter small compared to the wave length.

The several sound senders are respectively energized in such phase relationships that their energies will add to produce a maximum intensity in the direction of the line on which they are mounted. In Figures 1 and 2 the loops $p$ indicate the relative values of the intensity of the sound in the direction from the ends of the group. In Figure 3 the loop $p$ is indicated as perpendicular to the direction of the group of senders. This may be obtained by the proper phase relation between the various senders. The entire group $b$ is mounted in the tank $d$ by a suspension which will keep the group in a vertical position such as the gimbals $c$. It is evident that regardless of the position which may be taken by the ship, for example, that shown in Fig. 2, the direction of maximum sound radiation will always be vertically downwards.

Figure 3:
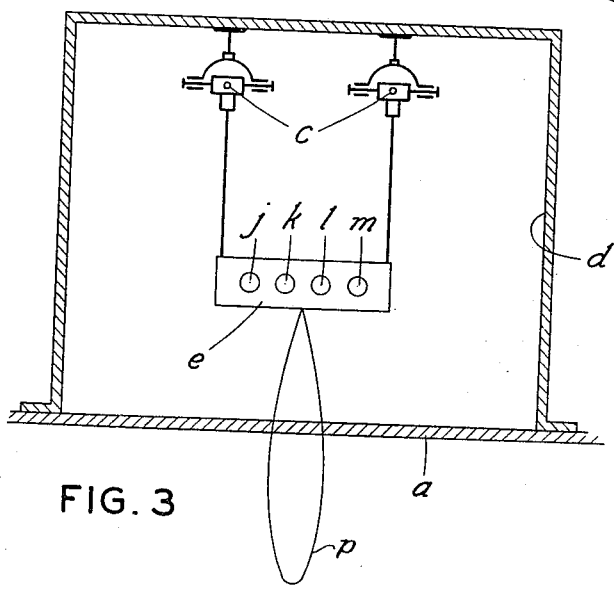

In Fig. 3 a different type of multispot group is shown. In this case a group of four sound radiators $j$, $k$, $l$ and $m$ are mounted along a horizontal line and all energized in the same phase whereby the sound energy radiation will have its maximum intensity in a plane perpendicular to the line of senders. The group of senders $e$ must, therefore, be arranged to remain horizontal regardless of the position of the ship and accordingly it is suspended by two gimbals $c$, as shown.

It is to be understood that, instead of using a multispot group of sound senders, a single sender the dimensions of whose radiating surface are large compared with the wave length may be employed, or alternatively a sound sender provided with a horn or other reflecting device may be used to provide a directive sound beam. As indicated in the drawing the sound sender when used on ships is usually mounted in a flooded chamber or in special water-filled tanks provided for the purpose. On aircraft the sound senders may be mounted in the fuselage, or special shields may be provided to protect the sender from air currents which might tend to force it out of its proper position.

According to the present invention the system is preferably provided with some means to prevent a continuous swinging of the sound sender. Suitable means for damping the oscillations may be used or the masses may be proportioned in such a manner that a continuous swinging is inhibited. When the sender is mounted in a water-filled chamber as on board the ship, the water itself provides a considerable damping to the undesired motion and further damping means may not in all cases be necessary. I find, however, that it is desirable to arrange the suspension in such a manner that the natural period of oscillation of the system differs from the period of roll or pitch of the vessel so that a resonance between the two is avoided.

Having now described my invention, I claim:

1. In an acoustic echo distance measuring system, means for producing compressional waves having a maximum intensity in a sharply defined direction and means for suspending said producing means within the carrying vessel adapted to permit said producing means to maintain a predetermined position irrespective of the motion of the supporting vessel.

2. In an acoustic echo distance measuring system, means for producing a beam of compressional waves with a maximum intensity in a sharply defined direction and having a point of suspension and a weight distribution such that when suspended by said point said means will assume under the action of gravity a position directing said maximum intensity vertically downwards and means for suspending said producing means from said point of suspension adapted to permit said producing means to remain in the position determined by the force of gravity irrespective of the position of the carrying vessel.

3. In an acoustic echo distance measuring system, means for producing a sharply directed beam of compressional waves comprising a plurality of individual sound producers arranged vertically above one another and means for suspending said group of sound producers adapted to permit the latter to remain in a vertical position irrespective of the position of the carrying vessel.

4. In an acoustic echo distance measuring system, means for producing a sharply directed beam of compressional waves comprising a plurality of individual sound producers arranged vertically above one another and means including gimbals for suspending said group of sound producers within a carrying vessel whereby said group will remain in a vertical position irrespective of the position of the carrying vessel.

5. In an acoustic echo distance measuring system, means for producing compressional waves comprising a plurality of individual sound producers arranged along a horizontal straight line and in a unitary structure whereby a plane of maximum intensity will be radiated perpendicular to said straight line and means for suspending said group within a carrying vessel including a pair of gimbals attached one to each end of said unitary structure whereby said plane of maximum radiation will be vertical irrespective of the position of the carrying vessel.

6. In an acoustic echo distance measuring system, means for producing compressional waves having a maximum intensity in a sharply defined direction and means for suspending said producing means within the carrying vessel adapted to permit said producing means to maintain a predetermined position irrespective of the motion of the supporting vessel, the natural oscillation frequency of the system formed by the suspended producing means being substantially different from the natural period of roll of the carrying vessel.

7. In an acoustic echo distance measuring system, means for producing compressional waves having a maximum intensity in a sharply defined direction, means for suspending said producing means within the carrying vessel adapted to permit said producing means to maintain a predetermined position irrespective of the motion of the supporting vessel and means for damping movements of said producing means away from said predetermined position.

8. In an acoustic echo distance measuring system, means for producing compressional waves having a predetermined position for a maximum intensity in a sharply defined direction downward, and means for freely suspending said producing means to maintain said predetermined position irrespective of the motion of the suspending means.

9. In an acoustic echo distance measuring system, means for producing compressional waves having a predetermined position for a maximum intensity in a sharply defined direction downward, and means for automatically maintaining said producing means in relation to the suspending means to maintain said predetermined position irrespective of the motion of the suspending means.

WALTER KUNTZE.